United States Patent
Yang

(10) Patent No.: US 9,501,188 B2
(45) Date of Patent: Nov. 22, 2016

(54) NOISE-SHIELDED CAPACITIVE TOUCH DEVICE

(71) Applicant: Kuan-Yi Yang, HsinChu (TW)

(72) Inventor: Kuan-Yi Yang, HsinChu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 0 days.

(21) Appl. No.: 14/330,967

(22) Filed: Jul. 14, 2014

(65) Prior Publication Data
US 2015/0055031 A1 Feb. 26, 2015

(30) Foreign Application Priority Data
Aug. 23, 2013 (TW) ................ 102130285 A

(51) Int. Cl.
*G06F 3/044* (2006.01)
(52) U.S. Cl.
CPC ..... *G06F 3/044* (2013.01); *G06F 2203/04107* (2013.01)
(58) Field of Classification Search
None
See application file for complete search history.

(56) References Cited

U.S. PATENT DOCUMENTS

| 2010/0110038 | A1 | 5/2010 | Mo et al. | |
| 2012/0169650 | A1* | 7/2012 | Chang | 345/174 |

FOREIGN PATENT DOCUMENTS

WO   WO 2012/118513 A1   9/2012

* cited by examiner

*Primary Examiner* — David D Davis
(74) *Attorney, Agent, or Firm* — Tung & Associates

(57) ABSTRACT

The present invention discloses a noise-shielded capacitive touch device, which includes a first sensor region, a second sensor region and a shielding layer. Each of the first sensor region and the second sensor region includes plural sensing lines and driving lines. The sensing lines are in parallel with each other and extend along a first direction. Each sensing line has an extension portion at its end near the other sensor region. The driving lines are in parallel with each other and extend along a second direction, wherein the second direction intersects the first direction. The extension portions and the shielding layer form an electric field wall to avoid cross interferences between the two sensor regions.

8 Claims, 2 Drawing Sheets

NOISE-SHIELDED CAPACITIVE TOUCH DEVICE

CROSS REFERENCE

The present invention claims priority to TW102130285, filed on Aug. 23, 2013.

BACKGROUND OF THE INVENTION

Field of Invention

The present invention relates to a noise-shielded capacitive touch device; particularly, it relates to such noise-shielded capacitive touch device capable of effectively isolating two sensor regions to avoid cross interferences.

Description of Related Art

Please refer to FIG. 1A, which shows a top view of a conventional capacitive touch device. The conventional capacitive touch device 10 shown in FIG. 1A is for example a mutual capacitance type touch panel which comprises multiple sensor regions. In the shown example, the capacitive touch device 10 comprises a first sensor region 11 and a second sensor region 12, wherein each of the first sensor region 11 and the second sensor region 12 is, for example, a capacitive touch sensor. Each of the first sensor region 11 and the second sensor region 12 includes plural driving lines DA1~DA9 in parallel along a first direction and plural sensing lines SA1~SA9 in parallel along a second direction, wherein the first and second directions are orthogonal to each other. Sensing nodes N11, N12, N13. . . , N98, N99 are provided at the intersections of the driving lines DA1~DA9 and the sensing lines SA1~SA9. The so-called mutual capacitive sensing method is to monitor the change of the capacitance at each of the sensing nodes N11, N12, N13. . ., N98, N99 in the sensor regions 11 and 12 of the capacitive touch device 10. For example, if each of the first sensor region 11 and the second sensor region 12 includes J driving lines and K sensing lines, then a total of (J×K) sensing nodes are formed in each sensor region. During operation, each of the driving lines DA1~DA9 is supplied by a driving voltage, and the charges of the driving lines DA1~DA9 are capacitively coupled to the corresponding sensing lines SA1~SA9 at each of the intersections (i.e., the sensing nodes N11, N12, N13. . . , N98, N99) to generate corresponding voltages sensible by the sensing lines SA1~SA9. For example, as shown in FIG. 1A, each of the first sensor region 11 and the second sensor region 12 includes 9 driving lines DA1~DA9 and 9 sensing lines SA1~SA9, thereby forming a total of 81 individual and spatially separated sensing nodes N11, N12, N13. . . , N98, N99 in each sensor region. When the capacitive touch device 10 is touched, a capacitance of a node that corresponds to the location of the touch changes, and the voltage sensed by a corresponding sensing line SA1~SA9 changes accordingly. Thus, the capacitive touch device 10 can sense touches.

Please refer to FIG. 1B, which shows a cross-sectional view of the conventional capacitive touch device 10. As shown in FIG. 1B, the capacitive touch device 10 further comprises a substrate 14. The plural sensing lines SA1~SA9 of the first sensor region 11 and the second sensor region 12 are disposed at one side of the substrate 14, and the plural driving lines DA1~DA9 of the first sensor region 11 and the second sensor region 12 are disposed at an opposite side of the substrate 14. In such configuration, an intersection of a driving line (e.g., DA9) and a sensing line (e.g., SA9) forms a sensing node (e.g., N99) as shown in FIG. 1A. The term "intersection" is used from top view perspective, indicating a location where one of the driving lines DA1~DA9 and one of the sensing lines SA1~SA9 "cross" or come nearest each other in their respective planes. From the perspective of cross-sectional view, the driving lines DA1~DA9 and the sensing lines SA1~SA9 do not directly contact one another; instead, they are capacitively coupled to one another at two sides of the substrate 14 at the intersections.

In the first sensor region 11 and the second sensor region 12, for example, the driving line DA9 and the sensing line SA9 are capacitively coupled to each other at the sensing node N99. That is, because the voltage level of the driving line DA9 is different from that of the sensing line SA9, a magnetic field line is formed at the sensing node N99. However, because the distance between the first sensor region 11 and the second sensor region 12 is short, a magnetic field line can also be formed between the driving line DA9 of the first sensor region 11 and the sensing line SA9 of the second sensor region 12, thus creating an interference between the first sensor region 11 and the second sensor region 12. A signal in one of the first sensor region 11 and the second sensor region 12 becomes a noise in the other sensor region.

To overcome this drawback, certain prior art proposes to dispose a shielding layer 13 between the first sensor region 11 and the second sensor region 12. More specifically, a large area shielding layer 13 is disposed on the same plane as the driving lines DA1~DA9. Preferably, the shielding layer 13 is substantially grounded (i.e., the shielding layer 13 is at or near a 0V electric level), or connected to a known electric level. The shielding layer 13 provides an electric field to attract undesired magnetic field lines, thus reducing the interference of noises. For example, some magnetic field lines will be formed between the driving line DA9 of the first sensor region 11 and the shielding layer 13 instead of between the driving line DA9 of the first sensor region 11 and the sensing line SA9 of the second sensor region 12. Nevertheless, this solution requires a great modification of the layout and it significantly enlarges the size of the device. In addition, the large area shielding layer 13 still can not completely avoid cross interferences between the first sensor region 11 and the second sensor region 12 (i.e., as shown in FIG. 1B, even though a large area shielding layer 13 is provided, a magnetic field line can still be formed between the driving line DA9 of the first sensor region 11 and the sensing line SA9 of the second sensor region 12, hence still resulting in undesirable cross interferences between the first sensor region 11 and the second sensor region 12.

In view of the above, to overcome the drawbacks in the prior art, the present invention proposes a noise-shielded capacitive touch device capable of effectively isolating two sensor regions to avoid cross interferences.

SUMMARY OF THE INVENTION

An objective of the present invention is to provide a noise-shielded capacitive touch device.

To achieve the above and other objectives, from one perspective, the present invention provides a noise-shielded capacitive touch device, comprising: a first sensor region and a second sensor region; wherein each of the first sensor region and the second sensor region includes: a plurality of sensing lines in parallel with each other and extending along a first direction, wherein each sensing line has an extension portion at its end near the other sensor region; a plurality of driving lines in parallel with each other and extending along a second direction, wherein the first and second directions intersect with each other, the plural sensing lines and the plural driving lines intersecting from a top view and being located at different elevation levels from a cross sectional view; and a shielding layer, which, from the top view, overlaps with each extension portion of each sensing line of the first sensor region and the second sensor region, whereby the extension portions and the shielding layer form an electric field wall to isolate the first sensor region and the second sensor region so as to avoid cross interferences between the first sensor region and the second sensor region.

In one embodiment, the noise-shielded capacitive touch device further comprises a substrate, wherein the plurality of sensing lines are disposed at a first side of the substrate and the plurality of driving lines and the shielding layer are disposed at a second side of the substrate, wherein the second side is opposite to the first side.

In one embodiment, the shielding layer is substantially grounded.

In one embodiment, each sensing line includes one or more sensing electrodes, and each driving line includes one or more driving electrodes.

From another perspective, the present invention provides a noise-shielded capacitive touch device, comprising: a substrate; a first sensor region, including: a plurality of first sensing lines disposed at a first side of the substrate, which are in parallel with each other and extend along a first direction; and a plurality of first driving lines disposed at a second side of the substrate, which are in parallel with each other and extend along a second direction, wherein the second side is opposite to the first side, and the second direction intersect with the first direction, and wherein the plurality of first sensing lines intersect with the plurality of first driving lines from a top view; a second sensor region, including: a plurality of second sensing lines disposed at a first side of the substrate, which are in parallel with each other and extend along a first direction; and a plurality of second driving lines disposed at a second side of the substrate, which are in parallel with each other and extend along a second direction, wherein the second side is opposite to the first side, and the second direction intersect with the first direction, and wherein the plurality of second sensing lines intersect with the plurality of second driving lines from a top view; and an electric field wall between the first sensor region and the second sensor region for isolating the first sensor region and the second sensor region to avoid cross interferences between the first sensor region and the second sensor region.

In one embodiment, the electric field wall includes: a first electrode on the first side of the substrate; and a second electrode on the second side of the substrate.

In one embodiment, the second electrode includes a shielding layer, which is not in direct contact the plural first driving lines and the plural second driving lines, and is substantially grounded.

In one embodiment, the first electrode includes a plurality of first extension portions and a plurality of second extension portions, the plural first extension portions being directly connected to the corresponding plural first sensing lines respectively and the plural second extension portions being directly connected to the corresponding plural second sensing lines respectively.

The objectives, technical details, features, and effects of the present invention will be better understood with regard to the detailed description of the embodiments below, with reference to the attached drawings.

DESCRIPTION OF THE PREFERRED EMBODIMENTS

Figure 1A:
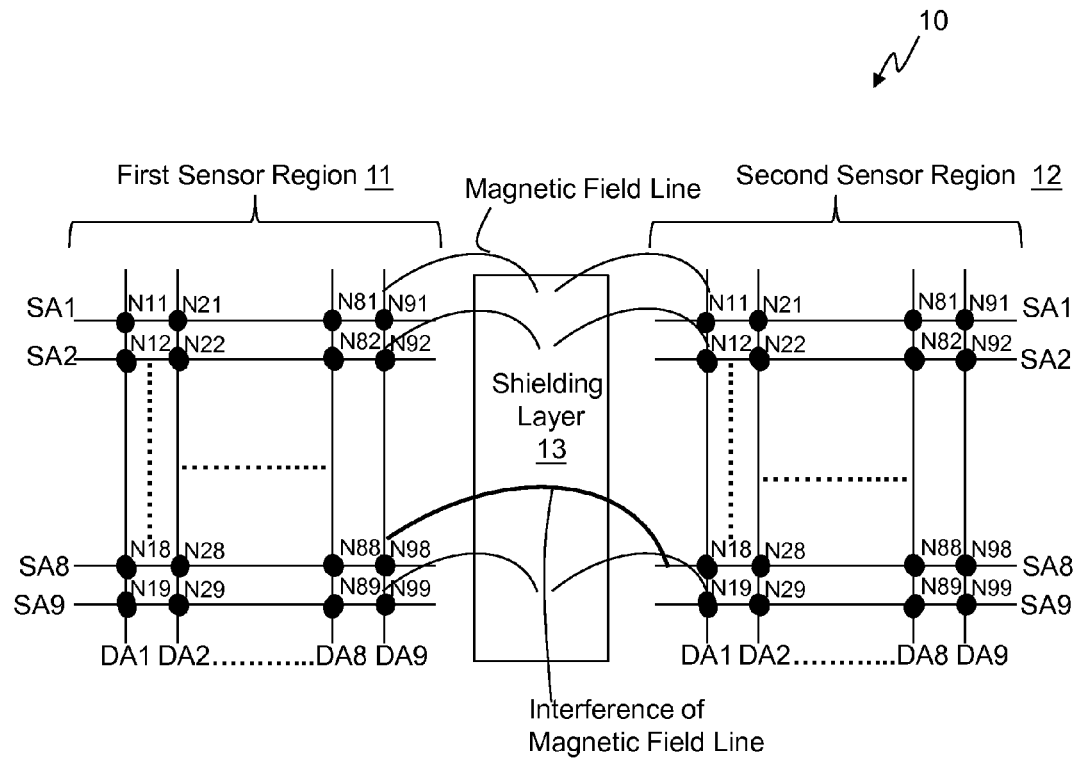
FIG. 1A shows a top view of a conventional capacitive touch device.
Figure 1B:
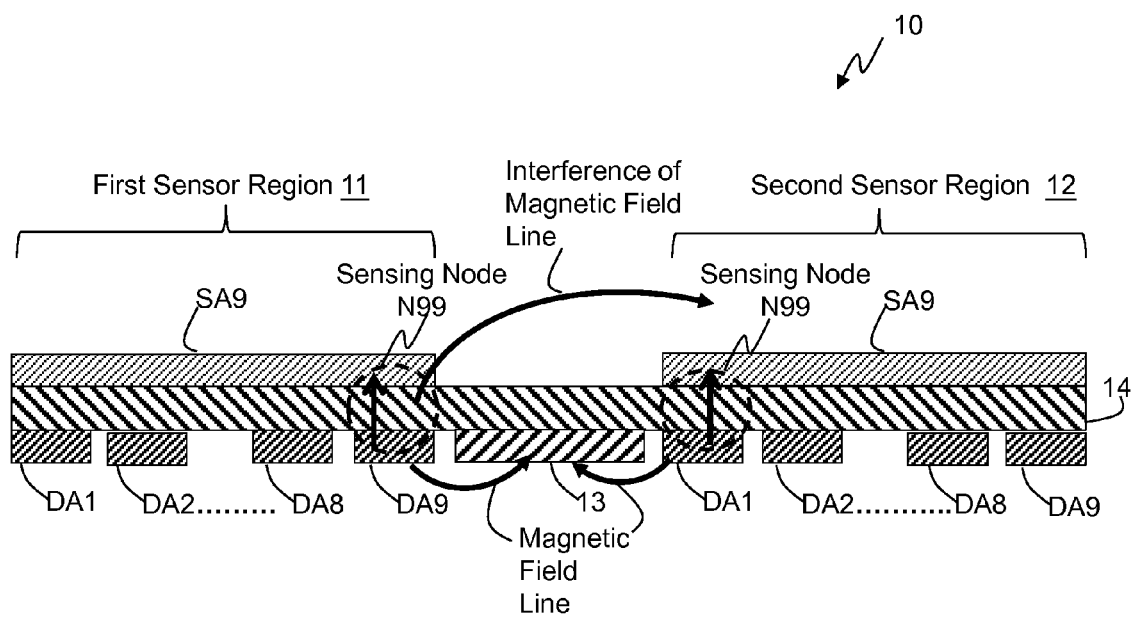
FIG. 1B shows a cross sectional view of a conventional capacitive touch device.

The above and other technical details, features and effects of the present invention will be will be better understood with regard to the detailed description of the embodiments below, with reference to the drawings. In the description, the words relate to directions such as "upper", "lower", "left", "right", "forward", "backward", etc. are used to illustrate relative orientations in the drawings and should not be considered as limiting in any way. The drawings as referred to throughout the description of the present invention are for illustration only, to show the interrelations between the apparatus and the devices, but not drawn according to actual scale.

Figure 2A:
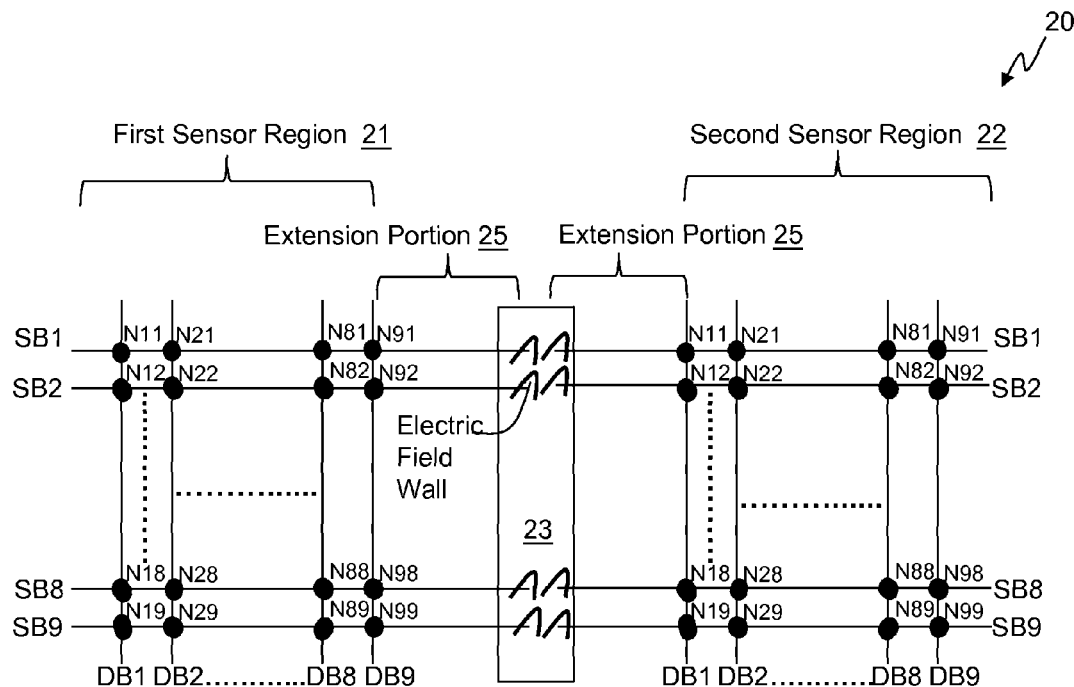
FIG. 2A shows a top view of a noise-shielded capacitive touch device according to an embodiment of the present invention.

Please refer to FIG. 2A, which shows a top view of a noise-shielded capacitive touch device according to an embodiment of the present invention. The noise-shielded capacitive touch device 20 shown in FIG. 2A can be, for example, a mutual capacitance type touch panel. The noise-shielded capacitive touch device 20 comprises a first sensor region 21, a second sensor region 22 and a shielding layer 23, wherein each of the first sensor region 21 and the second sensor region 22 can be, for example, a capacitive touch sensor. Each of the first sensor region 21 and the second sensor region 22 includes plural driving lines DB1~DB9 substantially in parallel with one another and extending along a first direction (e.g., a lateral direction), and plural sensing lines SB1~SB9 spaced apart with one another and extending along a second direction (e.g., a longitudinal direction); the first and second directions intersect with each other and in one embodiment, the first and second directions are orthogonal to each other. As shown in the top view of FIG. 2A, the sensing lines SB1~SB9 and the driving lines DB1~DB9 intersect and preferably are orthogonal to each other, and as shown in the cross sectional view of FIG. 2B, the sensing lines SB1~SB9 and the driving lines DB1~DB9 are located at different elevation levels.

In one embodiment, each of the sensing lines SB1~SB9 includes one or more sensing electrodes, and each of the driving line DB1~DB9 includes one or more driving electrodes. The sensing electrodes or a part of the sensing electrodes can be, for example, one or more metal conductive meshes or can be made of Indium Zinc Oxide (IZO). The driving electrodes or a part of the driving electrodes can be, for example, one or more metal conductive meshes or can be made of Indium Zinc Oxide (IZO). The above-mentioned metal conductive meshes can include copper, silver or other conductive materials.

The present invention is different from the conventional capacitive touch device 10 in that, in this embodiment, each of the of sensing lines SB1~SB9 of the noise-shielded capacitive touch device 20 has an extension portion 25 at its end near the other sensor region (or the nearest sensor region if there are more than two sensor regions). The features and advantages of the extension portions 25 will be discussed later. Or, from another perspective of view, the plural extension portions 25 can be viewed as external segments which are directly connected to the corresponding plural sensing lines SB1~SB9. Sensing nodes N11, N12, N13..., N98, N99 are provided at the intersections of the driving lines DA1~DA9 and the sensing lines SA1~SA9. The so-called mutual capacitive sensing method is to monitor the change of the capacitance at each of the sensing nodes N11, N12, N13..., N98, N99 in the sensor regions 21 and 22 of the noise-shielded capacitive touch device 20. For example, if each of the first sensor region 21 and the second sensor region 22 includes J driving lines and K sensing lines, then a total of (J×K) sensing nodes are formed in each sensor region. During operation, each of the driving lines DA1~DA9 is supplied by a driving voltage, and the charges of the driving lines DA1~DA9 are capacitively coupled to the corresponding sensing lines SA1~SA9 at each of the intersections (i.e., the sensing nodes N11, N12, N13..., N98, N99) to generate corresponding voltages sensible by the sensing lines SA1-SA9. For example, as shown in FIG. 2A, each of the first sensor region 21 and the second sensor region 22 includes 9 driving lines DA1~DA9 and 9 sensing lines SA1~SA9, thereby forming a total of 81 individual and spatially separated sensing nodes N11, N12, N13..., N98, N99 in each sensor region. When the noise-shielded capacitive touch device 20 is touched, a capacitance of a node that corresponds to the location of the touch changes, and the voltage sensed by a corresponding sensing line SA1~SA9 changes accordingly. Thus, the noise-shielded capacitive touch device 20 can sense touches. Note that the above-mentioned number of the driving lines DB1~DB9 and the sensing lines SB1~SB9 are for illustrative purpose only, but not for limiting the scope of the present invention.

Figure 2B:
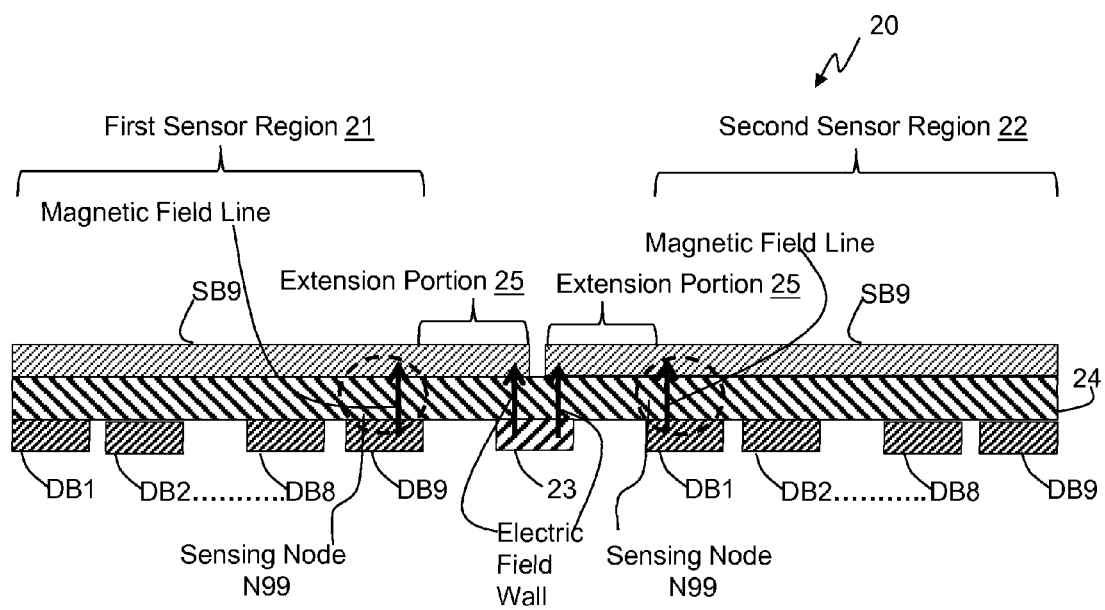
FIG. 2B shows a cross sectional view of a noise-shielded capacitive touch device according to an embodiment of the present invention.

Please refer to FIG. 2B, which shows a cross sectional view of the noise-shielded capacitive touch device 20 according to an embodiment of the present invention. As shown in FIG. 2B, the noise-shielded capacitive touch device 20 further comprises a substrate 24. The plural sensing lines SA1~SA9 of the first sensor region 21 and the second sensor region 22 are disposed at one side of the substrate 24, and the plural driving lines DA1~DA9 of the first sensor region 21 and the second sensor region 22 are disposed at an opposite side of the substrate 24. That is, the substrate 24 is disposed between a plane where the sensing lines SB1~SB9 are located on and another plane where the driving lines DB1~DB9 are located on. The sensing lines SB1~SB9, the substrate 24 and the driving lines DB1~DB9 are stacked (in the described order from top to bottom in FIG. 2B) to form the noise-shielded capacitive touch device 20. In such configuration, an intersection of a driving line (e.g., DB9) and a sensing line (e.g., SB9) forms a sensing node (e.g., N99) as shown in FIG. 2A. The term "intersection" is used from top view perspective, indicating a location where one of the driving lines DA1~DA9 and one of the sensing lines SA1~SA9 "cross" or come nearest each other in their respective planes. From the perspective of cross-sectional view, the driving lines DA1~DA9 and the sensing lines SA1~SA9 do not directly contact one another; instead, they are capacitively coupled to one another at two sides of the substrate 14 at the intersections. In the first sensor region 21 and the second sensor region 22, for example, the driving line DA9 and the sensing line SA9 are capacitively coupled to each other at the sensing node N99. That is, because the voltage level of the driving line DA9 is different from that of the sensing line SA9, a magnetic field line is formed at the sensing node N99.

In one embodiment, the substrate 24 can be a transparent insulating thin plate made of or including a material selected from a group consisting of, for example but not limited to: glass, polycarbonate (PC), polyester (PET), polymethyl methacrylate (PMMA) or cyclic olefin copolymer (COC). However, the substrate 24 is not limited to being made from the above-mentioned materials.

Still referring to FIG. 2B, in this embodiment, preferably, the noise-shielded capacitive touch device 20 further comprises a shielding layer 23, which is disposed on the bottom side of the substrate 24 (i.e., the shielding layer 23 is on the same side as the driving lines DB1~DB9 and on the opposite side to the sensing lines SB1~SB9). That is, the shielding layer 23 is located at the same layer with the driving lines DB1~DB9 but is not in direct contact to the driving lines DB1~DB9. The thickness of the shielding layer 23 can be the same as or different from that of the driving lines DB1~DB9. In one embodiment, the shielding layer 23 is connected to ground. In one embodiment, the shielding layer 23 can be or can comprise a copper foil plate or a flexible print circuit (FPC). As compared with the large area shielding layer 13 in the conventional capacitive touch device 10, the shielding layer 23 of the noise-shielded capacitive touch device 20 occupies a much smaller area. From top view, the shielding layer 23 (preferably grounded) overlaps with the extension portion 25 of each sensing line DB1~DB9 in the first sensor region and the second sensor region. Because the voltage level of the extension portion 25 of each sensing line DB1~DB9 is different from the voltage level of the shielding layer 23, an electric field wall can be formed between the extension portion 25 of each sensing line DB1~DB9 and the shielding layer 23. The extension portion 25 can be regarded as an upper electrode of the electric field wall, and the shielding layer 23 can be regarded as a lower electrode of the electric field wall. As a result, no magnetic field line will be formed between the driving line DB9 of the first sensor region 21 and the sensing line SB9 of the second sensor region 22, and likely, nonmagnetic field line will be formed between the driving line DB9 of the second sensor region 22 and the sensing line SB9 of the first sensor region 21. Therefore, by overlapping the shielding layer 23 with the extension portion 25 of each sensing line DB1~DB9 in the first sensor region 21 and the extension portion 25 of each sensing line DB1~DB9 in the second sensor region 22, the noise-shielded capacitive touch device 20 can effectively isolate two adjacent sensor regions to avoid cross interferences.

The present invention has the following features and advantages: at the boundary between the first sensor region 21 and second sensor region 22, because each sensing line SB1~SB9 has an extension portion 25 at its end near the other sensor region, the extension portion 25 of each sensing line SB1~SB9 can form an electric field wall with the shielding layer 23. As a consequence, only a small size shielding layer 23 is required to avoid cross interferences between two adjacent sensor regions. The present invention can be applied to a noise-shielded capacitive touch device comprising two or more capacitive touch sensor regions, effectively isolating two sensor regions to avoid cross interferences.

In the above-mentioned preferable embodiment, the upper electrode of the electric field wall is formed by the extension portion 25 of each sensing line DB1~DB9. Alternatively, in another embodiment, the upper electrode of the electric field wall can be formed by a structure similar to the shielding layer 23. That is, another shielding layer can also be formed between the sensing lines DB1~DB9 of the first sensor region 21 and the sensing lines DB1~DB9 of the second sensor region 22. Such configuration is not as effective as the above-mentioned embodiment, but it is also within the scope of the present invention.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A noise-shielded capacitive touch device, comprising:
   a substrate;
   a first sensor region, including:
      a first upper electrode disposed at a first side of the substrate, which extends along a first direction, wherein the first upper electrode has a first extension portion extending along the first direction at its end near the other sensor region; and
      a first lower electrode disposed at a second side of the substrate, which extends along a second direction, wherein the second side is opposite to the first side, and the second direction intersect with the first direction, and wherein the first upper electrode overlaps with the first lower electrode from a top view;
   a second sensor region, including:
      a second upper electrode disposed at the first side of the substrate, which extends along the first direction, wherein the second upper electrode has a second extension portion extending along the first direction at its end near the other sensor region; and
      a second lower electrode disposed at the second side of the substrate, which extends along the second direction, wherein the second side is opposite to the first side, and the second direction intersect with the first direction, and wherein the second upper electrode overlaps with the second lower electrode from the top view, and wherein the first upper electrode does not overlap with the second lower electrode from the top view, and wherein the second upper electrode does not overlap with the first lower electrode from the top view; and
   a shielding layer, which, from the top view, overlaps with the first extension portion of the first upper electrode of the first sensor region and the second extension portion of the second upper electrode of the second sensor region, but does not overlap with the first lower electrode and the second lower electrode, whereby the first extension portion and the shielding layer form a first electric field wall and the second extension portion and the shielding layer form a second electric field wall, to isolate the first sensor region and the second sensor region so as to avoid cross interferences between the first sensor region and the second sensor region.

2. The noise-shielded capacitive touch device of claim 1, wherein the shielding layer is disposed at the second side of the substrate.

3. The noise-shielded capacitive touch device of claim 1, wherein the shielding layer is substantially grounded.

4. The noise-shielded capacitive touch device of claim 1, wherein the first upper electrode includes a plurality of first sensing lines, and the second upper electrode includes a plurality of second sensing lines, and the first lower electrode includes a plurality of first driving lines, and the second lower electrode includes a plurality of second driving lines.

5. The noise-shielded capacitive touch device of claim 4, wherein each first sensing line includes one or more first sensing electrodes and each second sensing line includes one or more second sensing electrodes.

6. The noise-shielded capacitive touch device of claim 4, wherein each firs driving line includes one or more firs driving electrodes and each second driving line includes one or more second driving electrodes.

7. The noise-shielded capacitive touch device of claim 4, wherein the first extension portion is directly connected to the corresponding plurality of first sensing lines respectively, and the second extension portion is directly connected to the corresponding plurality of second sensing lines respectively.

8. The noise-shielded capacitive touch device of claim 4, wherein the shielding layer is not in direct contact to the plurality of first driving lines and the plurality of second driving lines.

* * * * *